United States Patent [19]

Tsukahara et al.

[11] Patent Number: 5,506,651
[45] Date of Patent: Apr. 9, 1996

[54] INDICATING APPARATUS OF A CAMERA

[75] Inventors: Daiki Tsukahara, Hiratsuka; Hiroshi Wakabayashi, Yokohama; Yuji Katano, Kawasaki, all of Japan

[73] Assignee: Nikon Corporation, Tokyo, Japan

[21] Appl. No.: 479,395

[22] Filed: Jun. 7, 1995

Related U.S. Application Data

[63] Continuation of Ser. No. 223,819, Apr. 6, 1994, abandoned, which is a continuation of Ser. No. 92,529, Jul. 16, 1993, abandoned.

[30] Foreign Application Priority Data

| Jul. 22, 1992 | [JP] | Japan | 4-195495 |
| Aug. 7, 1992 | [JP] | Japan | 4-211219 |

[51] Int. Cl.$^6$ .................................. G03B 17/00
[52] U.S. Cl. .................................. 354/289.1; 354/465
[58] Field of Search .................. 354/127.13, 289.1, 354/289.11, 289.12, 409, 465, 469, 470

[56] References Cited

U.S. PATENT DOCUMENTS

| 2,351,978 | 6/1944 | Kuppenbender | 354/470 |
| 2,992,600 | 7/1961 | Rentschler | 354/469 X |
| 4,118,726 | 10/1978 | Kuramoto et al. | 354/289 |
| 4,168,898 | 9/1979 | Orban | 354/289 |
| 4,837,596 | 6/1989 | Kawamura | 354/442 |
| 5,148,201 | 9/1992 | Umetsu et al. | 354/195.1 |
| 5,189,466 | 2/1993 | Yasukawa et al. | 354/289.12 X |

FOREIGN PATENT DOCUMENTS

| 5-150307 | 6/1993 | Japan . |

*Primary Examiner*—Howard B. Blankenship

[57] ABSTRACT

An indicating apparatus of a camera, has an indicating unit, a driving unit and an adjusting unit. The indicating unit includes an indicating member capable of indicating any of a plurality of indicated positions. The driving unit drives the indicating member on the basis of information on photography of the camera. The adjusting unit is capable of adjusting the indicated position of the indicating member irrespective of the information on the present photography of the camera. Each indicated position corresponds to an item of information on the photography of the camera.

18 Claims, 7 Drawing Sheets

INDICATING APPARATUS OF A CAMERA

This application is a continuation of application Ser. No. 08/223,819, filed Apr. 6, 1994, now abandoned, which is a continuation of applaication 08/092,529, filed Jul. 16, 1993, now abandoned.

BACKGROUND OF THE INVENTION

1. Field of the Invention

The present invention relates to an indicating apparatus of a camera which is driven by a motor driving unit.

2. Related Background Art

An indicating apparatus of a camera which includes a motor driving means is disclosed in, e.g., Japanese Patent Application No. 3-214613 filed by the present applicant.

The indicating apparatus according to the application described above is constructed to effect an indication by means of a rotary needle. The indicating apparatus is constructed of three elements, i.e., a shot frame number indicating portion for indicating the number of shot frames, a strobe indicating portion for indicating a flash mode of a strobe and a self-timer indicating portion for indicating modes of a self-timer.

A rotary needle of each indicating portion is driven by a stepping motor. The stepping motor is driven by an instruction from a CPU. The rotary needle is rotationally driven by this stepping motor.

Based on the conventional indicating apparatus explained above, the stepping motor malfunctions due to a shock applied to the camera in operation, a sudden trouble caused by intensive electromagnetic waves and an abrupt breakdown of a power unit. If an indication by the needle once shifts from the correct position, the operation is thereafter performed in an as-shifted state. This conduces to a problem in which a precise indication can not be given.

For instance, when the indicating portion for indicating the shot frame number of a film indicates the frame number 10, the stepping motor malfunctions due to the above-described shock, with the result that the needle position shifts to the frame number 11. It thereafter follows that the frame number is counted 12, 13 and so on. A correct frame number can not be known. Besides, even when rewinding the film and taking it out after the photography has been finished, the CPU causes the stepping motor to rotate reversely corresponding to the shot frame number. Hence, the indicating portion gives indications remaining shifted, wherein the zeroth frame should be indicated, but the first frame is to be indicated.

Further, a known apparatus for indicating a variety of items of photographic information on the camera has hitherto involved the use of a liquid crystal indicating apparatus for digitally indicating a shutter time (sec) and giving pictorial indications through a self-timer. In another known apparatus, the photographic conditions are indicated as well as being set by providing a rotary dial for setting a shutter time and an f-number.

If the liquid crystal indicating apparatus and the rotary dial are installed in a limited space of the upper or rear surface of the camera, however, the indicating characters become smaller. There arises a problem in which the multiple items of information containing the photographic conditions are hard to see.

SUMMARY OF THE INVENTION

It is a primary object of the present invention to provide an indicating apparatus of a camera which is capable of returning position indicated by a rotary needle to a correct position if a camera control state does not coincide with the position indicated by the rotary needle of an indicating portion.

It is another object of the present invention to provide an indicating apparatus of a camera which is constructed to make it easier to see a variety of items of photographic information by utilizing a confined space of the camera.

To accomplish the objects given above, according to one aspect of the present invention, an indicating apparatus of a camera comprises an indicating portion, including an indicating member driven by a motor driving means, for indicating a camera control state such as an exposure control mode and a shot frame number. The indicating apparatus also comprises a setting change means for changing the camera control state and driving the indicating member. The indicating apparatus further comprises a motor driving control means for driving the indicating member without changing the camera control state.

To accomplish the objects given above, according to another aspect of the present invention, a camera indicating apparatus for indicating a variety of items of information on a film shot frame number, a strobe control state, etc. comprises indicating needles for indicating the photographic information and motor driving means for driving the indicating needles. The indicating apparatus also comprises a first indication index, provided within a range indicated by one of the indicating needles, for showing a first item of photographic information and a second indication index, provided within the same range, for showing a second item of photographic information. The indicating apparatus further comprises a selecting means for selecting one of the first and second indication indices and a motor driving control means for controlling the motor driving means to drive the indicating needle to the indication index selected by this selecting means.

The plurality of items of photographic information are indicated by the single indicating needle rotationally driven. It is therefore possible to reduce the number of driving units and of the indicating needles as compared with the items of photographic information to be indicated. Required costs and space can be thereby restrained small.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

FIGS. 1 to 4 illustrate an embodiment of an indicating apparatus of a camera according to the present invention.

Figure 1:
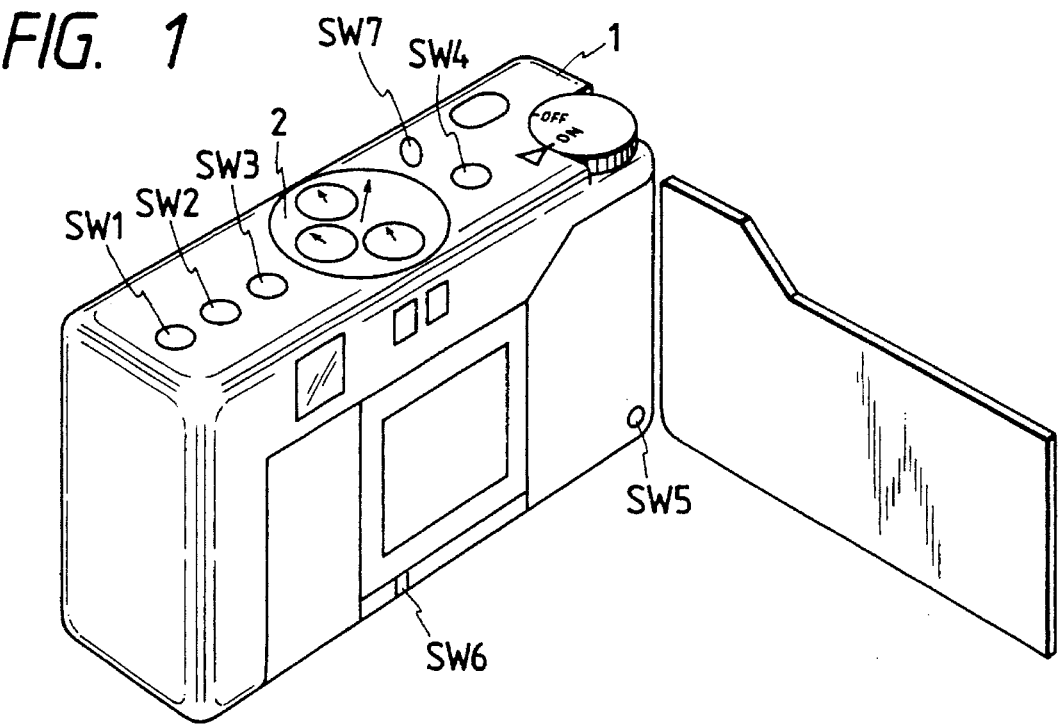
FIG. 1 is a view of a whole camera but illustrates a state where a rear cover is opened in accordance with an embodiment of the present invention.
Figure 2:
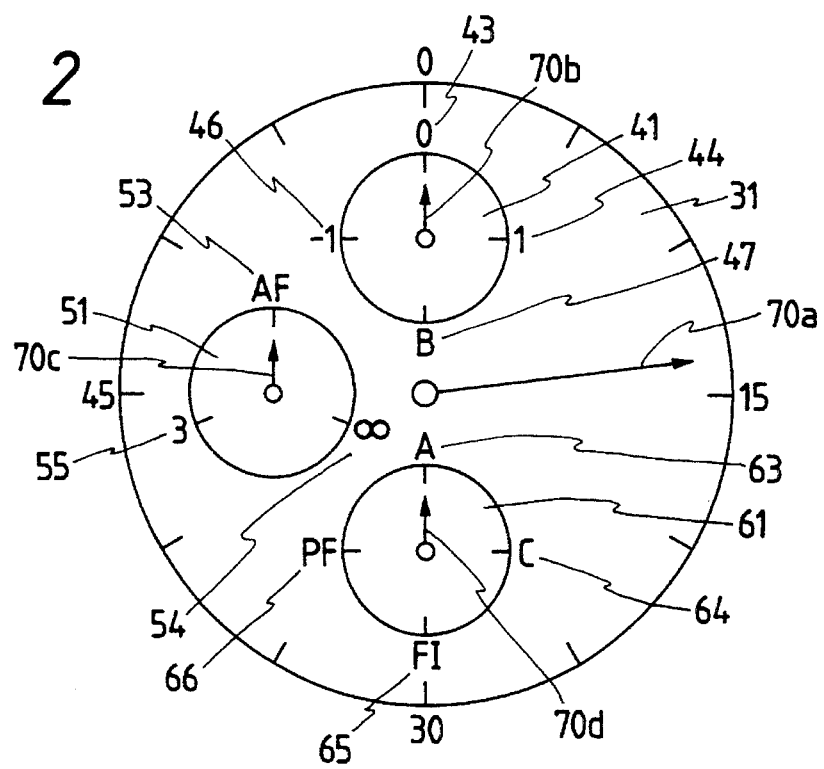
FIG. 2 is a view showing an indicating apparatus of the camera by way of an embodiment of the present invention.
Figure 3:
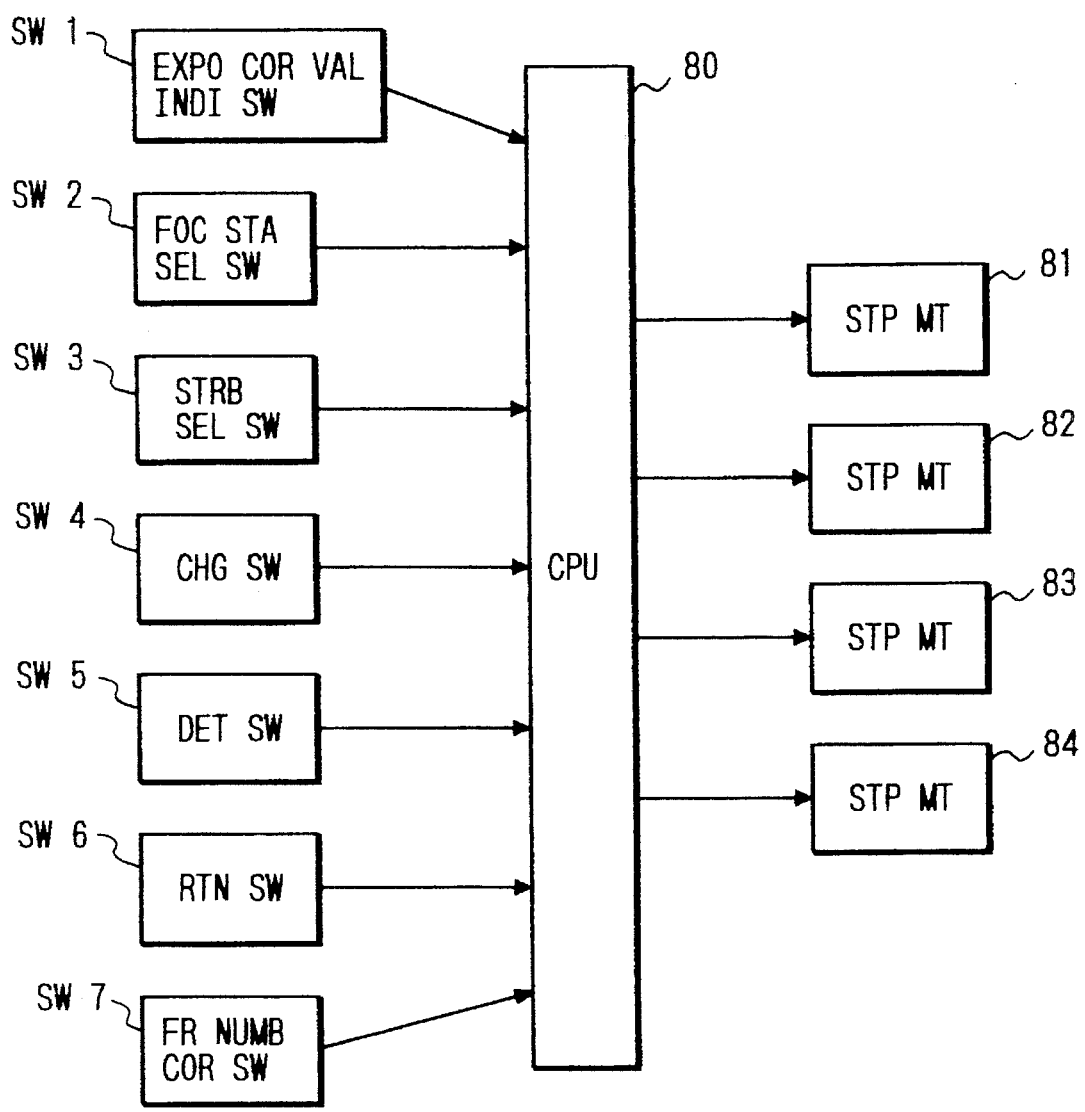
FIG. 3 is a block diagram illustrating a camera system by way of an embodiment of the present invention.
Figure 4:
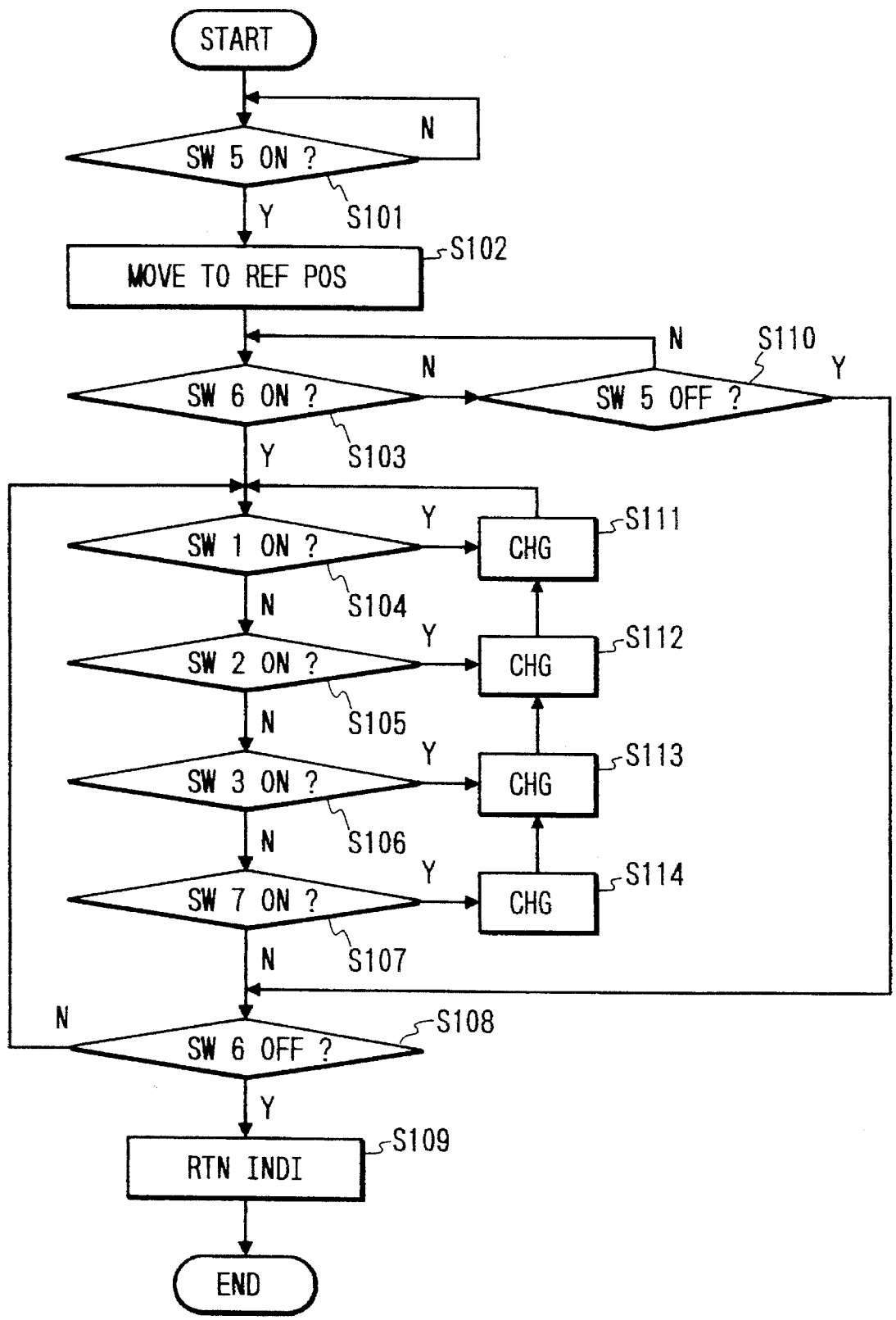
FIG. 4 is a flowchart showing actions of a CPU of FIG. 3.

FIG. 1 is a view of the whole apparatus but shows a state where a rear cover of the camera is opened in accordance with the embodiment of this invention. FIG. 2 is a diagram depicting the indicating apparatus of the camera in accordance with the embodiment of this invention. FIG. 3 is also a block diagram showing a camera system by way of an embodiment of this invention. FIG. 4 is a flowchart showing actions of a CPU illustrated in the block diagram.

At the first onset, a construction of the camera in this embodiment will be described with reference to FIG. 1.

Provided on the upper surface of a camera body 1 are an indicating apparatus 2, an exposure correction value indicating switch SW1, a focal state selecting switch SW2, a strobe selecting switch SW3, a change switch SW4, and a frame number correcting switch SW7. The exposure correction value indicating switch SW1 is employed to select setting of an exposure correction value. The focal state selecting switch SW2 is used to select a focusing mode. The strobe selecting switch SW3 is employed to select a flash mode of the strobe. The change switch SW4 is employed to change a numeric value of the mode selected by the switches SW1–SW3. The frame number correcting switch SW7 is used to correct the number of shot frames.

When a rear cover of the camera is opened, there may be seen a detection switch SW5 and a return switch SW6 mounted on the body. The detection switch SW5 serves to detect the fact that the rear cover is opened. The return switch SW6 works to, if a position indicated by the CPU does not coincide with an actual position indicated by a rotary needle, return the position indicated by the needle position to a correct position.

Next, the indicating apparatus 2 sketched in FIG. 1 will be explained in greater detail with reference to FIG. 2.

An interior of a frame number indicating portion 31 for indicating the number of shot frames is formed with an exposure correction value indicating portion 41 for indicating an exposure correction quantity, a focus indicating portion 51 for indicating a focal state and a strobe indicating portion 61 for indicating a flash mode of the strobe.

The shot frame number indicating portion 31 is capable of counting up to film shot frame number 60. FIG. 2 shows that the 14th frame is to be shot presently.

The exposure correction indicating portion 41 indicates a quantity of exposure correction as done when undergoing back light by means of a non-correction indication 43, a one Ev overexposure indication 44 and a one Ev underexposure indication 46. The symbol B implies a bulb mode 47 in which the exposure takes place for a duration of pushing of a release button. Referring to FIG. 2, the exposure correction indicating portion 41 is set in a non-correction state.

The focal state indicating portion 51 indicates a focusing state by means of an AF mode indication 53 for focalizing based on autofocusing, a distant view mode indication for fixing a focal point to the infinity and a fixed focus mode indication 55 for fixing the focal point to 3 mm exhibiting a high using frequency. Referring again to FIG. 2, the focal state indicating portion 51 is set to autofocusing.

The strobe indicating portion 61 indicates a flash mode of the strobe by means of an autoflash indication 63 for automatically emitting a flash of light when in the dark, a forcible flash indication 65 for forcibly emitting a flash of light and a pre-flash indication 66 for emitting a preparatory flash of light before photography to relieve the pink-eye effect.

In FIG. 2, the strobe indicating portion 61 is set in a state of the autoflash.

Rotary needles 70a–70d are secured at the centers of the respective indicating portions. The rotary needles are all driven by independent stepping motors (not shown).

The quantity of the exposure correction, the focus adjusting state and the flash mode of the strobe are changeable in terms of their setting states according to an intention of the photographer.

The photographer selects a mode to be changed through switches SW1–SW3 and thereafter makes a change by depressing a change switch SW4. A change in the exposure correction quantity is selectable by depressing the switch SW1. Then, the exposure correction quantity can be changed by manipulating the switch SW4 while depressing the switch SW1.

When performing the above-mentioned manipulation once from the state of FIG. 2, the exposure correction indicating portion indicates a correction quantity of the one Ev overexposure. With a repetition of the manipulations, the bulb mode, the one Ev underexposure and the non-correction are cyclically switched. The photographer turns OFF the switch SW1, thereby setting the exposure correction quantity.

A change in the focusing state can be selected by depressing the switch SW2. Then, the focusing state can be changed by manipulating the switch SW4 while depressing the switch SW2.

When effecting the above-mentioned manipulation once from the state of FIG. 2, the focal state indicating portion indicates the distant view mode. With a repetition of the manipulations, the fixed focus mode and the autofocusing are cyclically switched. The photographer turns OFF the switch SW2, whereby the focusing state is set.

A change in the flash mode of the strobe can be changed by manipulating the switch SW3. Then, the strobe flash mode can be changed by manipulating the switch SW4 while depressing the switch SW3.

When performing the above-mentioned manipulation once from the state of FIG. 2, the strobe indicating portion indicates a flash inhibition mode. With a repetition of the manipulations, the forcible flash mode, the pre-flash mode and the autoflash mode are cyclically switched. The photographer turns OFF the switch SW3, thereby setting the flash mode of the strobe.

A reference position of the rotary needle of the shot frame number indicating portion is 0. Reference positions of the rotary needles of other indicating portions are as shown in FIG. 2. Reference control states of the camera are based on the frame number 0, the non exposure correction, the autofocusing and the autoflash. Further, every time the control state is changed, this state is stored in a memory incorporated into the CPU.

When the detection switch SW5 detects that the rear cover is opening, the CPU returns the control state to the reference state, and simultaneously each rotary needle is driven.

As explained earlier, the stepping motor malfunctions due to a shock exerted on the camera when used, a sudden trouble by intensive electromagnetic waves and an abrupt breakdown of the power unit. In this instance, the camera control state is different from an indicated position of the indicating portion, It therefore follows that the indicating portion does not return to the reference position even when the CPU makes the camera control state revert to the reference state.

Accordingly, if each rotary needle is not in the reference position illustrated in FIG. 2 when opening the rear cover, the photographer pushes the switches SW1–SW3 and SW7 of the respective indicating portions while depressing the return switch SW6. The stepping motors are thus driven the number of times corresponding to the pushing actions, with the camera control state kept in the reference state. The rotary needles can be thereby forcibly rotated. The needles may be rotated in any direction, whether rightward or leftward.

Then, the return switch SW6 is turned OFF, whereby the indicated position at this time becomes a new reference position.

More specifically, the photographer pushes the switches SW1–SW3 and SW7 of the respective indicating portions while depressing the return switch SW6. The indicated position is thus changed. Just when the rotary needle comes to the reference position, the return switch SW6 is turned OFF. The control state of the camera and the indicated position of the indicating portion are so modified as to coincide with each other.

Subsequently, when the detection switch SW5 is turned OFF, the camera control state is set in the control state stored before being changed. The rotary needle of the indicating portion is driven correspondingly. As a result, a modification is made so that the camera control state coincides with the indicating state of the indicating portion.

FIG. 3 is a block diagram showing a camera system in accordance with this embodiment.

Inputted to the CPU are output signals from the exposure correction value indicating switch SW1, the focal state selection switch SW2, the strobe selection switch SW3, the change switch SW4, the detection switch SW5 and the return switch SW6.

The output signals from the CPU are inputted to an frame number stepping motor 81, an exposure correction stepping motor 82, a focus indication stepping motor 83 and a strobe indication stepping motor 84 respectively for driving the rotary needles of the frame number indicating portion 31, the exposure correction indicating portion 41, the focus indicating portion 51 and the strobe indicating portion 61.

Next, the actions of the CPU shown in FIG. 3 will be explained with reference to a flowchart of FIG. 4. Paying attention to this flowchart, it is assumed that the camera control state be stored at the start thereof.

The fact that the detection switch SW5 is turned ON is detected in step S101. The action proceeds to step S102 wherein the camera control state is set in the reference state, and, at the same time, signals are correspondingly outputted to the respective stepping motors 81–84 to rotate the rotary needles. The action then goes forward to step S103.

In step S103, on detecting that the return switch SW6 is turned ON, the action proceeds to step S104. Whereas if not, the action proceeds to step S110.

In step S104, the output signal from the exposure correction value indicating switch SW1 is inputted. When detecting the fact of being turned ON, the action proceeds to step S111. Whereas if not, the action goes to step S105.

In step S111, the output signal is outputted to the exposure correction stepping motor 82 so that an indication of the exposure correction indicating portion is changed corresponding to the number of pushing actions of the exposure correction value indicating switch SW1 ON-detected in step S104. The action then goes back to step S104.

In step S105, the output signal from the focal state selection switch SW2 is inputted. When detecting its turn-ON, the action proceeds to step S112. Whereas if not, the action goes to step S106.

In step S112, the output signal is outputted to the focus indication stepping motor 83 so that the indication of the focal state indicating part is changed corresponding to the number of pushing actions of the focal state selection switch SW2 ON-detected in step S105. The action then goes back to step S104.

In step S106, the output signal from the strobe selection switch SW3 is inputted. When detecting its turn-ON, the action proceeds to step S113. Whereas if not, the action goes to step S107.

In step S113, the output signal is outputted to the strobe indication stepping motor 84 so that an indication of the strobe indicating portion is changed corresponding to the number of pushing actions of the strobe selection switch SW3 ON-detected in step S106. The action then goes back to step S104.

In step S107, the output signal from the frame number correcting switch SW7. When detecting the fact of being turned ON, the action proceeds to step S114. Whereas if not, the action goes to step S108.

In step S114, the output signal is outputted to the frame number stepping motor 84 so that an indication of the frame number indicating portion is changed corresponding to the number of pushing actions of the frame number correcting switch SW7 ON-detected in step S107. The action then goes back to step S104.

In step S108, the output signal from the return switch SW6 is inputted. When detecting its turn-OFF, the action proceeds to step S109. Whereas if not, the action goes back to step S104.

In step S109, the camera control state reverts to the state stored therein. Signals are correspondingly outputted to the respective stepping motors 81–84 to rotate the rotary needles. The action is thus ended.

Note that the return switch for returning the camera control state to the reference state is installed in the interior of the camera in this embodiment but may be attached to the exterior of the camera to enable the correction without uncovering the rear cover.

With this arrangement, it is possible to confirm whether or not a correct indication is given even in the middle of shooting the film.

As discussed above in greater detail, according to the present invention, it is possible to provide the indicating apparatus of the camera that is capable of returning the position indicated by the rotary needle to a correct position if the position indicated by the CPU does not coincide with the position to which the rotary needle of the indicating portion actually points.

The following is an explanation of another embodiment in conjunction with the drawings.

Figure 5:
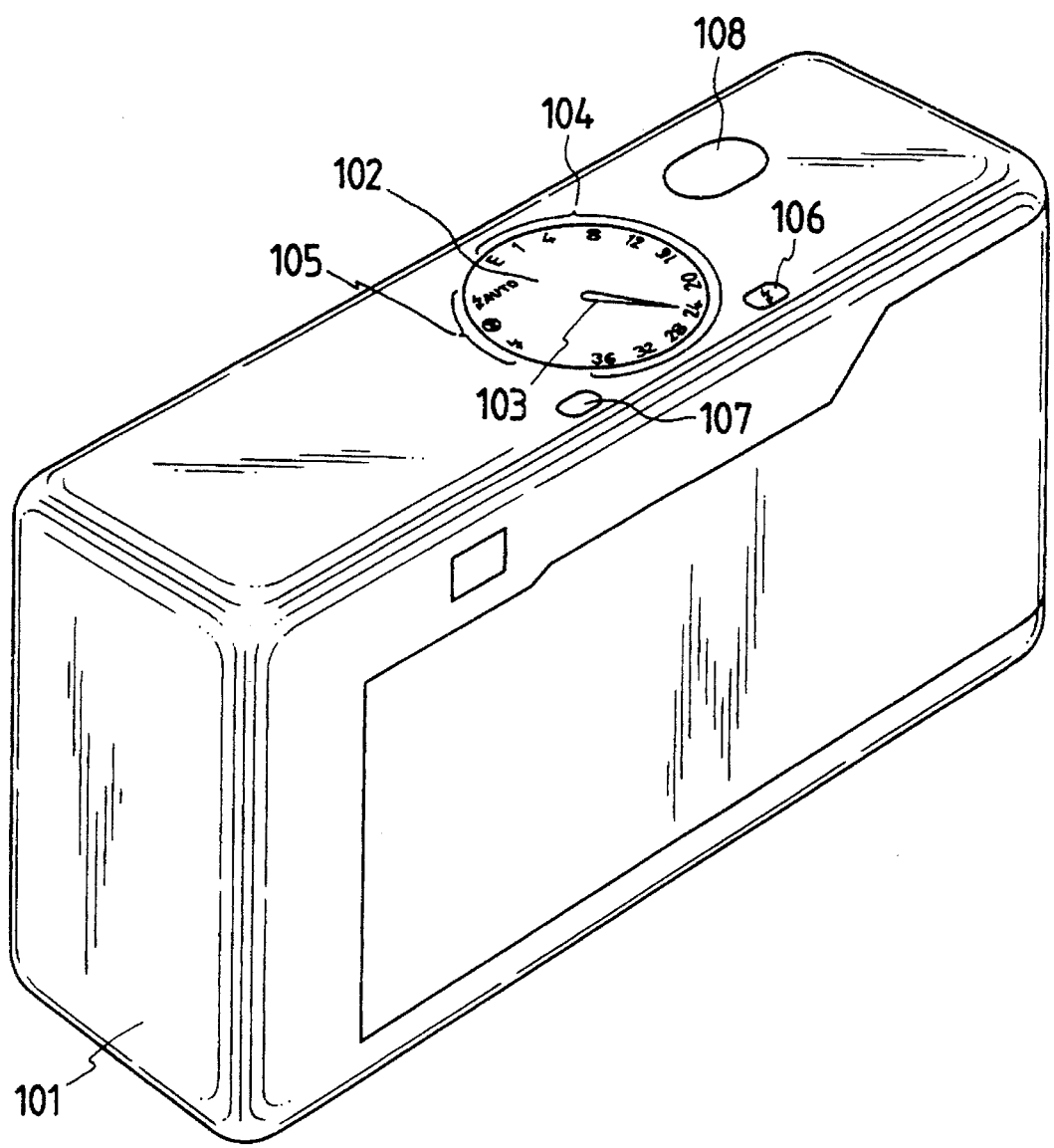
FIG. 5 is a perspective view of the whole camera as viewed from a rear side in accordance with an embodiment of the present invention.

FIG. 5 is a perspective view of a camera as viewed from a rear side in accordance with this embodiment of the present invention. FIGS. 2 and 3 are top views of the camera.

Referring to FIG. 5, the explanation starts with sketching an external configuration of the camera in this embodiment.

An indicating apparatus 102 is provided on the upper surface of a camera body 101. Installed in the vicinity of this indicating apparatus 102 are a strobe mode setting button 106 employed for setting a flash mode of the strobe and a feed button 107. Further, a release switch 108 for effecting a shutter release is provided at the right end toward a subject.

Next, the indicating apparatus 102 will be explained in detail with reference to FIG. 6.

The indicating apparatus 102 is constructed of an indication needle 103, a shot frame number indicating portion 104 and a strobe indicating portion 105. The indicating needle 103 is driven by a motor driving unit (not shown). The shot frame number indicating portion 104 indicates the number of shot frame of the film. The strobe indicating portion 105 serves to indicate a flash mode of the strobe.

The strobe indicating portion 105 comprises an auto strobe mode indication 105a wherein the strobe is automatically fired when darkened. The strobe indicating portion 105 also comprises a flash inhibition mode indication 105b for inhibiting the flash and a forcible flash mode indication 105c in which the strobe is forcibly fired.

Further, the shot frame number indicating portion 104 includes an indication [E] which implies that the film is not yet loaded and indices for indicating the frame numbers 1 to 36. FIG. 6 shows that the 24th frame is to be shot.

The motor driving unit for driving the indicating needle 103 is a stepping motor. Every time the film is taken up by one frame by means of a film feeding motor, the indicating needle 103 is driven by predetermined steps in response to the output signals transmitted from a microcomputer (CPU). If the film is not loaded, or if rewound, the indicating needle points to E. When the film is loaded and wound up to the 1st frame, the needle points to 1.

Next, the actual operations of the camera in accordance with this embodiment will be explained referring to FIGS. 7 to 9. To begin with, the way of setting the strobe mode will be explained with reference to FIG. 7.

Figure 7:
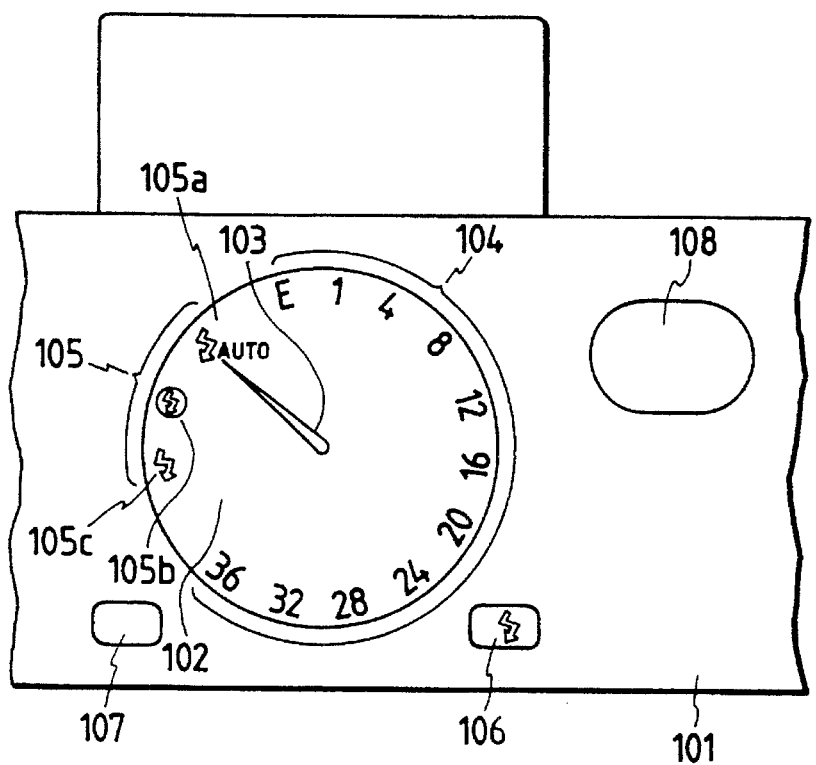
FIG. 7 is a top view of the camera but illustrates the above-mentioned indicating apparatus exhibiting a strobe indicating state.

FIG. 7 is a view depicting the indicating apparatus 102 of the camera when setting or confirming the strobe mode.

Figure 6:
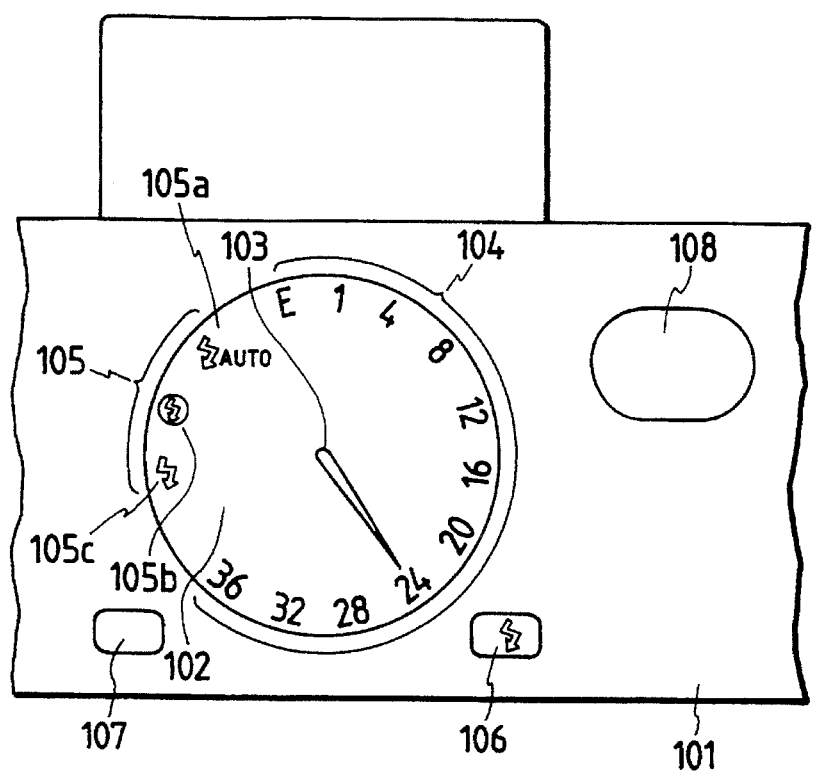
FIG. 6 is a top view of the camera but illustrates the above-mentioned indicating apparatus of the camera.

When pushing the strobe mode setting button 106, the indicating needle 103 is driven from, as illustrated in FIG. 6, a shot frame number indicating state to, as illustrated in FIG. 7, a strobe mode indicating state. The photographer pushes the strobe mode setting button 106 according to the necessity and is thereby capable of confirming a presently set strobe mode.

Herein, when depressing the feed button 107 while pushing the strobe mode setting button 106, the cyclic switching can take place in a sequence such as the auto strobe mode indication 105a, the flash inhibition mode indication 105b and the forcible flash mode indication 105c according to the number of pushing actions.

Then, a setting state of the strobe control unit of the camera is cyclically changed by the output signals from the CPU interlocking with this action.

After changing or confirming the setting, the strobe mode setting button 106 is turned OFF. The indicating needle 103 is thereby returned to a state of pointing to the shot frame number as shown in FIG. 6.

Driving of the unillustrated stepping motor for causing the motion of the indicating needle described above is controlled, as will be stated below, by a microcomputer (CPU).

This action will be explained in conjunction with a block diagram of FIG. 8 and a flowchart of FIG. 9.

Figure 8:
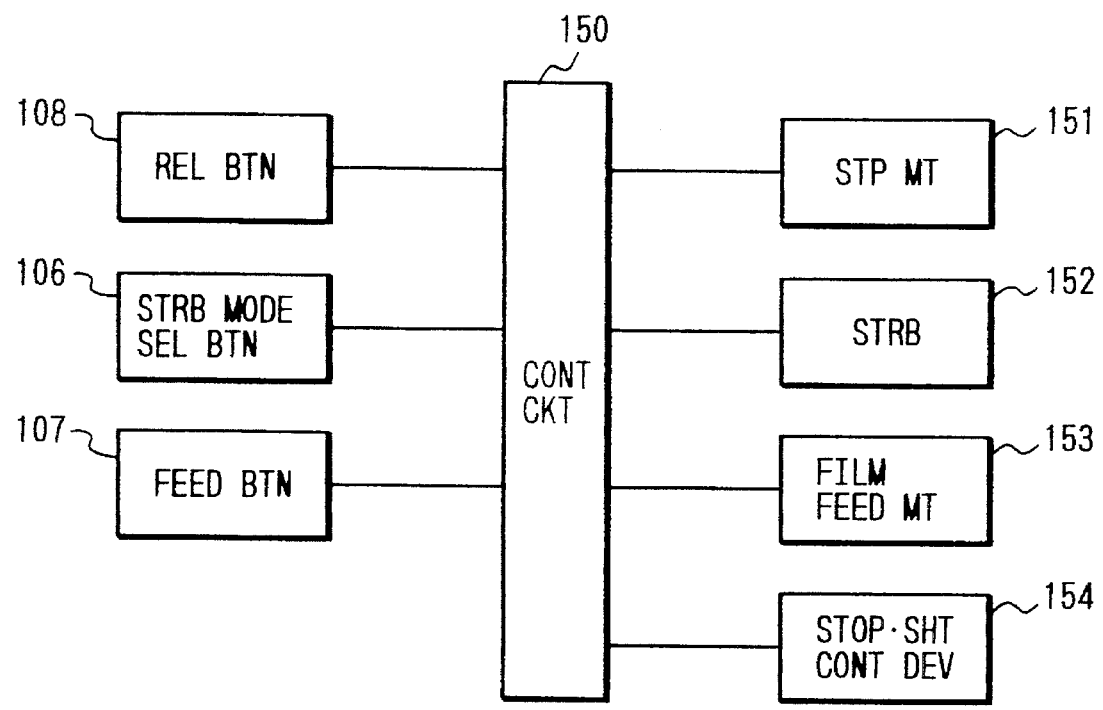
FIG. 8 is a block diagram illustrating a camera system in accordance with the embodiment of this invention.

FIG. 8 is the block diagram illustrating the system in this embodiment.

Inputted to a CPU 150 are output signals from the strobe mode setting button 106, the feed button 107, the release button 108 and a film feed motor 153. The output signals are, after being processed, outputted to a stepping motor 151 and a strobe control unit 152.

Figure 9:
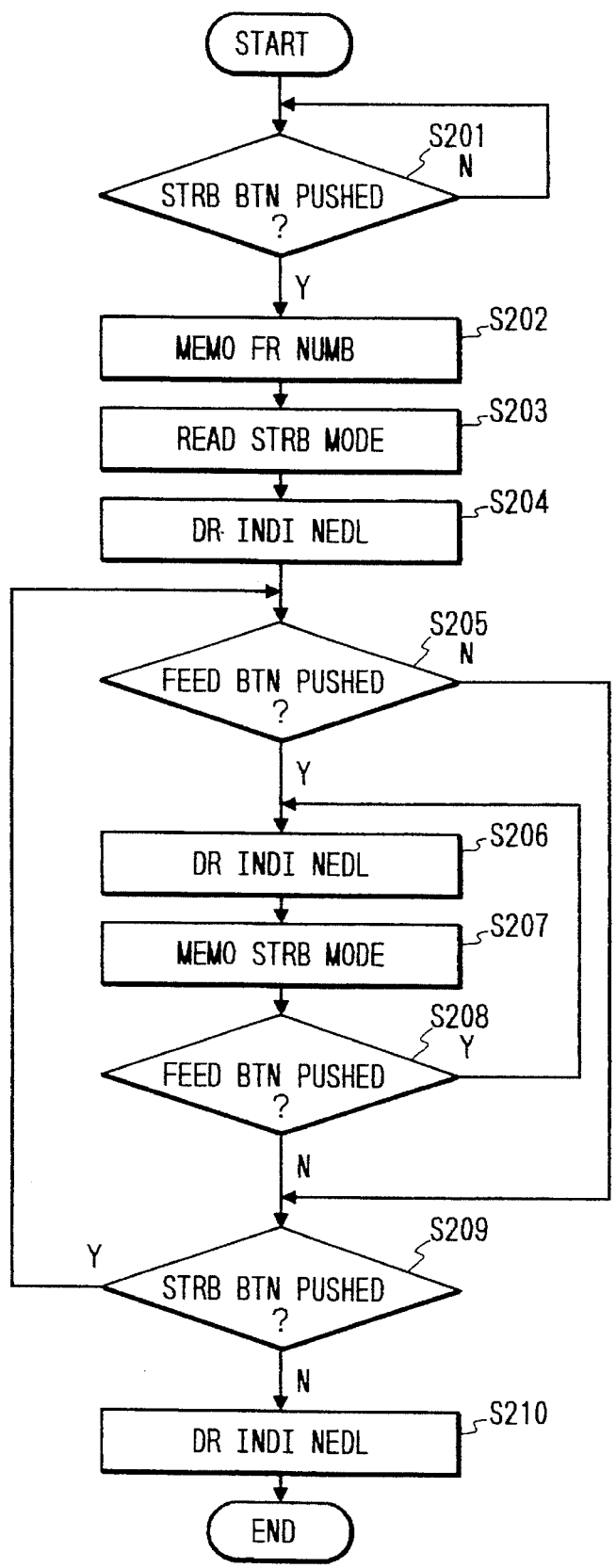
FIG. 9 is a flowchart showing actions of the CPU of FIG. 8.

FIG. 9 is the flowchart showing actions of the CPU of FIG. 8.

In step S201, the output signal from the strobe mode setting button 106 is inputted. When detecting its turn-ON, the action proceeds to step S202.

In step S202, the present shot frame number is stored, and the action proceeds to step S203.

In step S203, the output signal from the strobe control unit 152 is inputted, and the action proceeds to step S204.

Outputted to the stepping motor 151 in step S204 is a signal for driving the indicating needle 103 in a strobe control state read in step S203. The action then proceeds to step S205.

In step S205, the output signal from the feed button 107 is inputted. When detecting its turn-ON, the action proceeds to step S206. Whereas if not, the action proceeds to step S209.

In step S206, a signal for changing the strobe mode is outputted to the strobe control unit 152. Simultaneously, a signal for driving the indicating needle 103 by one scale is outputted to the stepping motor 151. The action proceeds to step S207.

In step S207, the strobe mode newly set in step S206 is stored, and the action proceeds to step S208.

In step S208, the output signal from the feed button 107 is inputted. When detecting its turn-ON, the action goes back to step S206. Whereas if not, the action proceeds to step S209.

In step S209, the output signal from the strobe mode setting button 106 is inputted. When detecting the fact of being turned ON, the action goes back to step S205. When detecting its turn-OFF, the action proceeds to step S210.

In step S210, a signal for driving the indicating needle 103 to point the shot frame number stored in step S202 is outputted to the stepping motor, thus ending the flow of actions.

The embodiment has been discussed so far in detail. However, the present invention is not, as a matter of course, limited to this embodiment. For instance, the photographic information to be indicated may involve anything such as, e.g., a self timer, continuous photographing, a film feed motor, an exposure correction value, an f-number, a shutter time (sec), a subject distance and a date-imprinting timer.

Further, the number of kinds of the photographic information is not limited to 2 but may be 3 or more. Besides, the indicating apparatus is not necessarily provided on the upper surface of the camera.

As discussed above, according to the present invention, various photographic conditions and information which are now set can be recognized by reading the numeric values, pictorial characters or symbols shown in the pointing direction of the needle rotationally driven. Therefore, the relatively large numeric values, characters and symbols can be put in a confined space of the camera. An indication easy to see can be provided at low costs.

Further, the photographic information of the camera can be indicated in the plurality of forms by means of the single indicating needle. It is therefore possible to provide a space-saved indicating apparatus of the camera at the low costs.

It is apparent that, in this invention, a wide range of different working modes can be formed based on the invention without deviating from the spirit and scope of the invention. This invention is not restricted by its specific working modes except being limited by the appended claims.

What is claimed is:

1. An indicating apparatus of a camera that receives and displays information related to a plurality of control states of the camera, the indicating apparatus comprising:

an indication mark including a plurality of indication positions which correspond to the plurality of the camera control states of the camera;

an indication member capable of specifying one of the indication positions;

an electric motor for making a relative movement between said indication mark and said indication member based on the control state of the camera; and a controller for adjusting a relative positional relationship between said indication mark and said indication member by driving said electric motor, without changing the control state of the camera.

2. The indicating apparatus of the camera according to claim 1, wherein said information related to a plurality of control states of said camera includes a flash control mode of a strobe.

3. The indicating apparatus of the camera according to claim 1, wherein said information related to a plurality of control states of said camera includes a number of shot frames of a film.

4. The indicating apparatus of the camera according to claim 1, wherein said information related to a plurality of control states of said camera includes an exposure correction quantity.

5. An indicating apparatus according to claim 1, further comprising a reset member for setting the control state of the camera to a reference condition, said controller being capable of driving said electric motor to adjust the relative positional relationship between said indication mark and said indication member when said reset member resets the control state of the camera to the reference condition.

6. An indicating apparatus according to claim 5, further comprising a storage device for storing the information related to a plurality of control states of the camera at the time when said reset member is operated, and a set member for controlling said electric motor to move said indication member to a position corresponding to the stored information related to a plurality of control states of the camera when an operation of said reset member is released.

7. An indicating apparatus of a camera according to claim 1, wherein said electric motor is driven so as to make a relative rotation between said indication mark and said indication member.

8. An indicating apparatus of an instrument comprising:

an indication mark including a first area and a second area;

an indication member capable of moving relative to said indication mark so as to change a relative positional relationship between said indication mark and said indication member, first information on an instrument operation being designated when said indication member is positioned on said first area, second information on another instrument operation being designated when said indication member is positioned on said second area;

an electric motor for making a relative movement between said indication mark and said indication member on the basis of the information on the instrument operation;

a selector capable of selecting either one of a first indication mode in which said indication member is relatively moved within said first area and a second indication mode in which said indication member is relatively moved within said second area; and a controller for adjusting a relative positional relationship between said indication mark and said indication member by driving said electric motor, so that said indication member is shifted to the area corresponding to said indication mode selected by said selector.

9. The indicating apparatus of the appliance according to claim 8, wherein said selecting means normally selects said first indication mode but selects said second indication mode only when manipulated.

10. The indicating apparatus of an instrument according to claim 8, wherein said instrument is a camera, a position of said indication member corresponds to a number of shot frames of film in said first indication mode, and a position of said indication member corresponds to a flash mode of strobe in said second indication mode.

11. An indicating apparatus according to claim 8, wherein said electric motor rotates said indication member.

12. An indicating apparatus according to claim 8, further comprising a reset member for resetting the information on the instrument operation to a reference condition, said controller being capable of driving said electric motor to adjust the relative positional relationship between said indication mark and said indication member when said reset member resets the information on the instrument operation to the reference condition.

13. An indicating apparatus according to claim 12, further comprising a storage device for storing the information on the instrument condition when said reset member is operated, and a set member for controlling said electric motor to move said indication member to a position corresponding to the stored information on the instrument operation when an operation of said reset member is released.

14. An indicating apparatus according to claim 8, wherein said instrument is a camera, the first information relates to a number of frames of film, and the second information relates to light emission from a strobe.

15. An indicating apparatus according to claim 8, further comprising a changing member for changing contents of at least one of the first indication mode and the second indication mode, said indication member being moved by said electric motor within an indication area corresponding to an indication mode selected by said selector, when said changing member is operated.

16. An indicating apparatus of a camera that receives and displays information related to a plurality of control states of the camera, the indicating apparatus comprising:

an indication mark having a plurality of indication positions including a reference position, each of said indication positions corresponding to a control state of the camera, said reference position corresponding to a reference control state of the camera;

an indication member capable of specifying one of the indication positions;

a driver for changing a relative positional relationship between said indication mark and said indication member on the basis of the control state of the camera; and a controller for controlling said driver to adjust a relative positional relationship between said indication mark and said indication member, without changing the control state of the camera.

17. An indicating apparatus according to claim 16, further comprising a detecting switch for detecting that a back cover of the camera is open, wherein said controller controls said driver so that said indication member specifies the reference position, when said detecting switch detects that the back cover of the camera is open and a reset member resets the control state of the camera.

18. A method of adjusting an indicating apparatus including an indication mark corresponding to information on photography of a camera, an indication member positioned so as to indicate on said indication mark, and a driver for relatively moving said indication member with respect to said indication mark on the basis of the information on photography of the camera, comprising the steps of:

storing the information on photography of the camera;

setting the information on photography of the camera to a reference condition and driving said indication member on the basis thereof;

driving said indication member without changing the information on photography of the camera; and driving said indication member to a position corresponding to the information on photography of the camera.

* * * * *